No. 612,194. Patented Oct. 11, 1898.
H. W. CLOUGH.
SNAP HOOK.
(Application filed Feb. 28, 1898.)
(No Model.)

Witnesses
Henry W. Clough, Inventor.
By his Attorneys,

UNITED STATES PATENT OFFICE.

HENRY W. CLOUGH, OF TOPEKA, KANSAS.

SNAP-HOOK.

SPECIFICATION forming part of Letters Patent No. 612,194, dated October 11, 1898.

Application filed February 28, 1898. Serial No. 672,070. (No model.)

*To all whom it may concern:*

Be it known that I, HENRY W. CLOUGH, a citizen of the United States, residing at Topeka, in the county of Shawnee and State of Kansas, have invented a new and useful Snap-Hook, of which the following is a specification.

My invention relates to snap-hooks, and has for its object to provide a simple, compact, and efficient construction and arrangement of parts whereby the engagement of a ring or other object may be accomplished with facility, while the accidental disengagement thereof is prevented without preventing the prompt disengagement when the hook is properly manipulated.

Further objects and advantages of this invention will appear in the following description, and the novel features thereof will be particularly pointed out in the appended claims.

Figure 1:
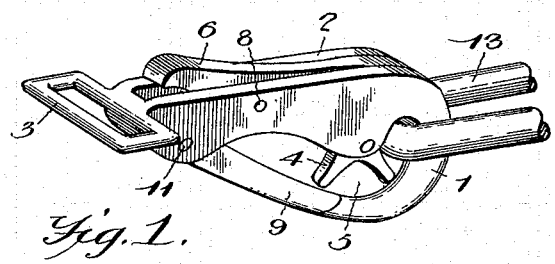
Figure 2:
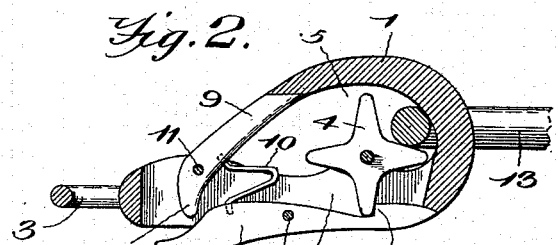
Figure 3:
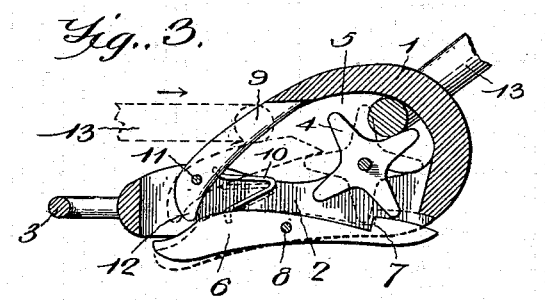
Figure 4:
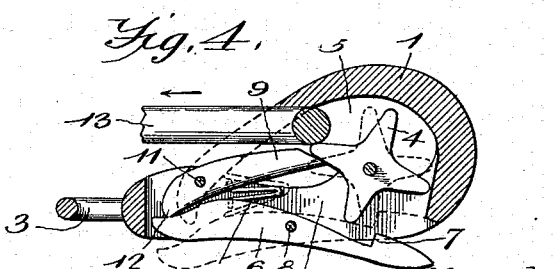

In the drawings, Figure 1 is a perspective view of a hook constructed in accordance with my invention. Fig. 2 is a longitudinal section of the same, showing the parts in their locked or normal positions. Fig. 3 is a similar view showing in dotted lines the position of a ring and the throat-tongue as the former is inserted in the hook and in full lines the position of the rotary throat-closer and the locking pawl or dog as the ring is carried toward its seat in the end of the hook. Fig. 4 is a similar view showing in full lines the positions of the parts when the locking pawl or dog is depressed to release the rotary stop and the stop has been turned by drawing a ring or its equivalent from the hook and showing in dotted lines the positions of the parts after the locking-pawl has been released.

Similar numerals of reference indicate corresponding parts in all the figures of the drawings.

The hook 1 is provided with a slotted back or shank 2, terminating in an eye 3, for attachment to a strap or equivalent connection. Mounted in the plane of the hook and between the walls of its slotted back is a rotary stop 4 of armed construction, each arm being of a length sufficient to close the throat 5 of the hook, and this stop is held from backward rotation by a locking pawl or dog 6, also mounted between the walls of the slotted back and having a shoulder 7 to engage a rearwardly-extending arm of the star-wheel. This pawl or dog is pivotally mounted at an intermediate point, as shown at 8. Also mounted in the slot of the back and normally closing the throat of the hook is a tongue 9, between which and the rearwardly-extended portion of the pawl or dog 6 is an expansion actuating-spring 10, adapted to yieldingly hold both the pawl and tongue in their normal positions, the former with its shoulder in the path of the arms of the star-wheel and the latter with its extremity bearing against the tip of the hook, and hence spanning the throat thereof. This tongue is also provided with an intermediate fulcrum-pin 11, in rear of which is an extension for terminal contact with the rearward extension of the locking pawl or dog, whereby when the extension of the pawl is pressed manually toward the body of the hook it will engage the extension of the tongue or a rearwardly-extending trip-pin 12 thereon to fold the tongue, and thereby allow the disengagement of a ring 13 or its equivalent from the hook. Obviously the manual depression of the rear end of the locking-pawl will disengage its shoulder from the rotary stop or throat-closer and will allow it to turn backwardly to release said ring or engaged device.

In engaging a ring or its equivalent with the hook the tongue should be depressed by means of said ring, after which the forward movement of the latter will turn the rotary stop until a succeeding arm of the latter is engaged by the pawl or dog. The advantage in the use of the tongue in addition to the locking-pawl and rotary stop resides in the fact that when the pawl is displaced to release the stop the tongue is also depressed at its free end to allow the contiguous arm of the stop to swing thereover, and upon the release of the pawl the return of the tongue to its normal position will throw the stop to such a position as to cause one of its arms to span the throat of the hook in such a position as to be fairly engaged by a ring or other object subsequently inserted for engagement with the hook.

It will be understood that while a four-armed rotary stop is preferable the number of arms may be varied without detracting from the efficiency of the apparatus, and, furthermore, while in the construction illustrated a single spring is employed for actuating the tongue and pawl or dog I do not desire to be understood as limiting myself to either a particular number or a definite position of spring or springs for yieldingly maintaining these parts in their normal positions.

Various changes in the form, proportion, and the minor details of construction may be resorted to without departing from the spirit or sacrificing any of the advantages of this invention.

Having described my invention, what I claim is—

1. The combination with a hook, of a rotary stop arranged to close the throat of the hook, and a yieldingly-actuated locking pawl or dog having a shoulder for engagement with said stop to prevent backward rotation thereof, substantially as specified.

2. The combination with a hook, of an armed rotary stop for closing the throat of the hook, and a spring-actuated locking pawl or dog, shouldered to engage an arm of said stop, and having an extension for manual pressure, to disengage the pawl from the stop, substantially as specified.

3. The combination with a hook, of a rotary armed stop, a locking-pawl yieldingly actuated for engaging said stop to prevent backward rotation thereof, and a tongue terminally arranged in the path of the arms of said stop, and operatively connected with the pawl or dog for folding simultaneously therewith, substantially as specified.

4. The combination with a hook, of a rotary armed stop, a spring-actuated locking pawl or dog for preventing backward rotation of the stop, and a spring-actuated tongue normally held in a position spanning the throat of the hook, adapted when folded to occupy a position in the path of the arms of the stop, and operatively connected with the said pawl for folding movement simultaneously therewith, substantially as specified.

5. The combination with a hook, of a rotary armed stop, a spring-actuated locking pawl or dog for preventing backward rotation of the stop, and having an exposed extension for manual pressure to release the stop, and a spring-actuated tongue normally closing the throat of the hook, and having a trip-pin arranged in the path of the extension of the pawl, whereby the tongue is folded simultaneously with the releasing movement of the pawl, substantially as specified.

In testimony that I claim the foregoing as my own I have hereto affixed my signature in the presence of two witnesses.

HENRY W. CLOUGH.

Witnesses:
L. V. CRUM,
JNO. W. GILHAM.